United States Patent [19]

Gotoh et al.

[11] Patent Number: 5,694,387
[45] Date of Patent: Dec. 2, 1997

[54] OPTICAL MEDIUM HAVING A DATA PATTERN FOR DETECTING AN UPSIDE-DOWN INSERTION, AND REPRODUCING APPARATUS FOR USE THEREWITH

[75] Inventors: Yasuhiro Gotoh, Kadoma; Yoshihisa Fukushima, Osaka; Michiyoshi Nagashima, Ikoma, all of Japan

[73] Assignee: Matsushita Electric Industrial Co., Ltd., Osaka-fu, Japan

[21] Appl. No.: 672,661

[22] Filed: Jun. 28, 1996

[30] Foreign Application Priority Data

Jun. 29, 1995 [JP] Japan .................. 7-163436
Aug. 21, 1995 [JP] Japan .................. 7-211952

[51] Int. Cl.$^6$ .................................................. G11B 7/24
[52] U.S. Cl. ............................... 369/275.3; 369/58
[58] Field of Search .......................... 369/275.3, 58, 369/54, 47, 48, 275.1; 358/335, 342, 343

[56] References Cited

U.S. PATENT DOCUMENTS 5,084,627  1/1992  Ueki et al. ........................ 250/561
5,235,581  8/1993  Miyagawa et al. ............... 369/58

*Primary Examiner*—Tan Dinh
*Attorney, Agent, or Firm*—Wenderoth, Lind & Ponack

[57] ABSTRACT

An optical medium comprises an information layer interposed between first and second transparent plates having about the same thicknesses. A light beam illuminates the information layer from a front side, or from a back side of the medium when the medium is inserted erroneously. Information is reproduced or recorded when the light beam illuminates the front side thereof. The information layer comprises a second area for recording a data pattern on which a direction of data arrangement can be easily determined, and a first area for recording main information. In order to determine which side of the disk is facing an optical head, the data pattern in the second area is reproduced, and the side can be determined according to a difference in direction of data arrangement in reproduced signals.

17 Claims, 10 Drawing Sheets

Order of reproduction : S1→S2→S3→····S7→S8

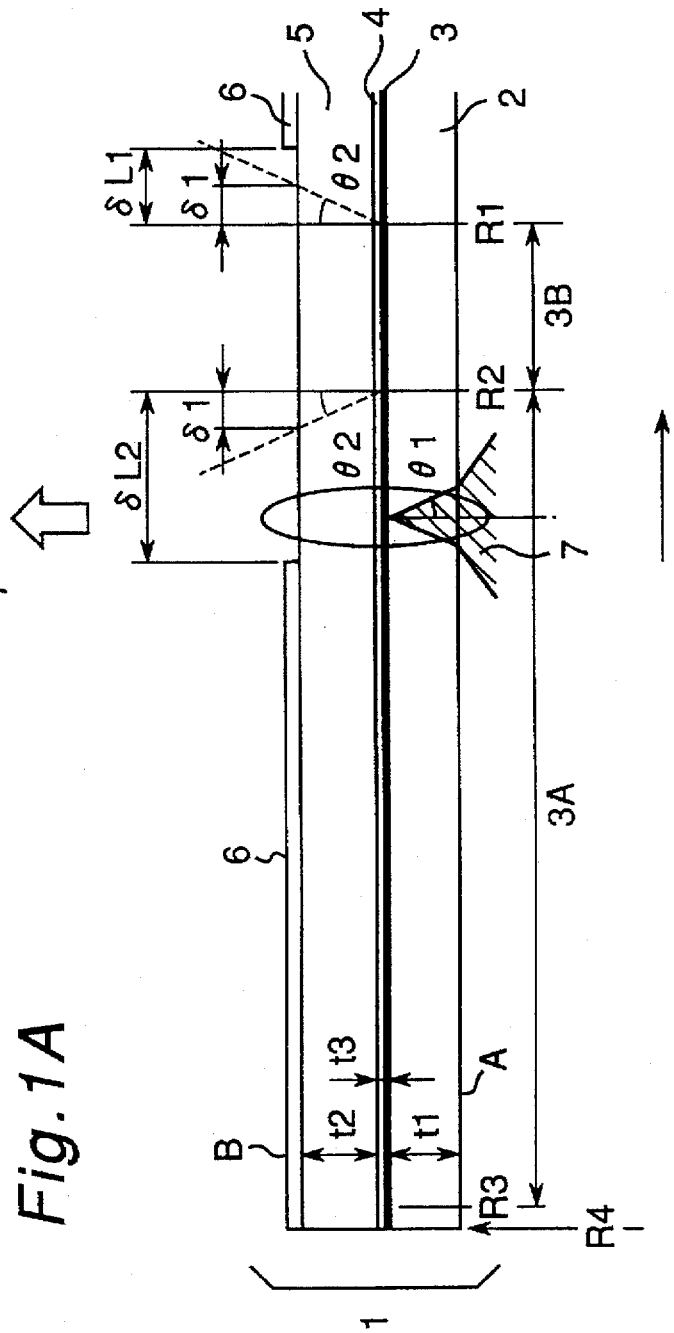
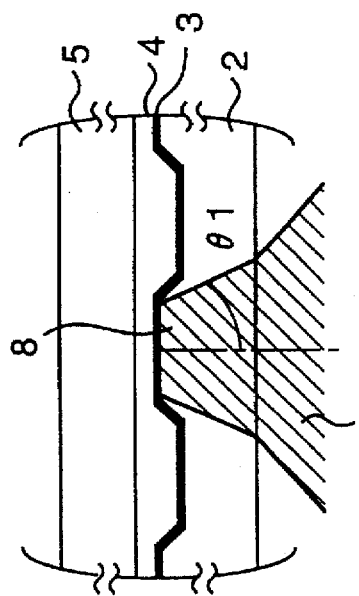
Fig. 1A
Fig. 1B

Order of reproduction : S1→S2→S3→···S7→S8

Order of reproduction : S8→S7→S6→···S2→S1

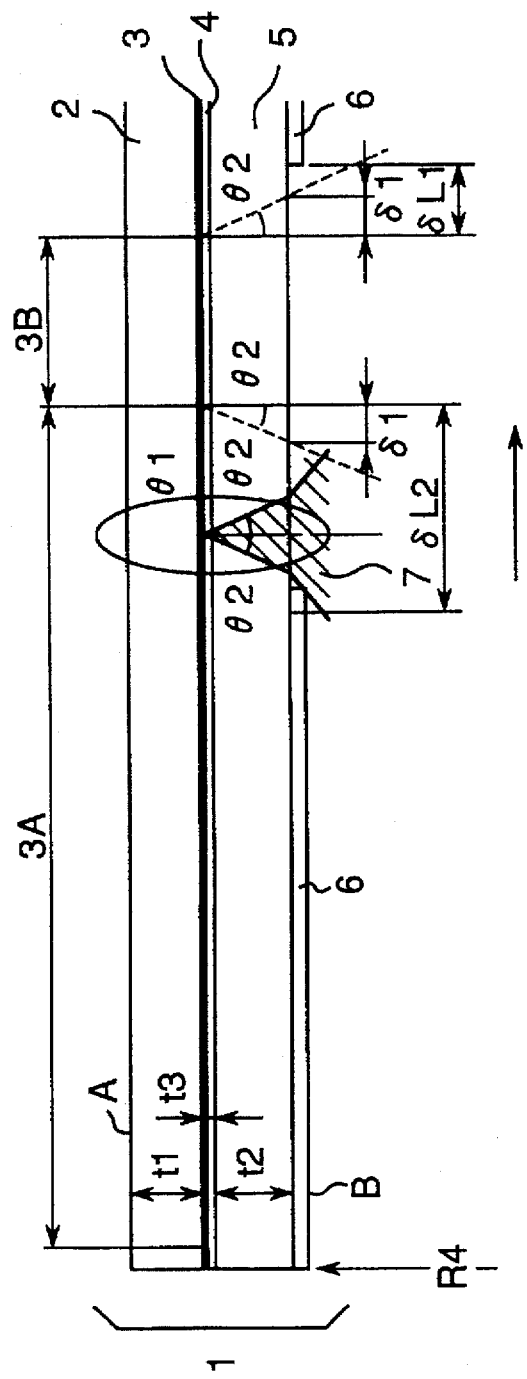
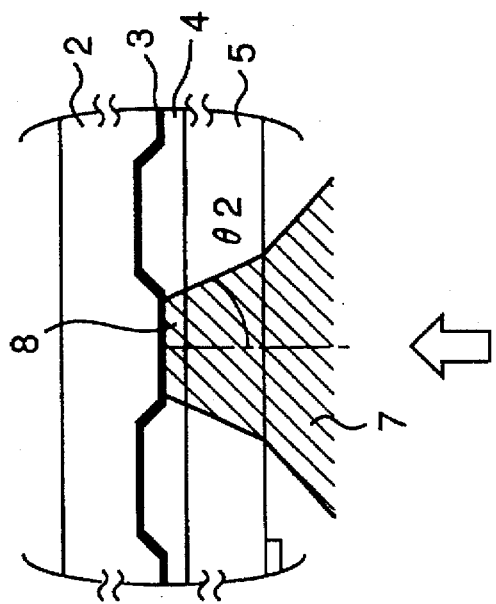
Fig.3A
Fig.3B

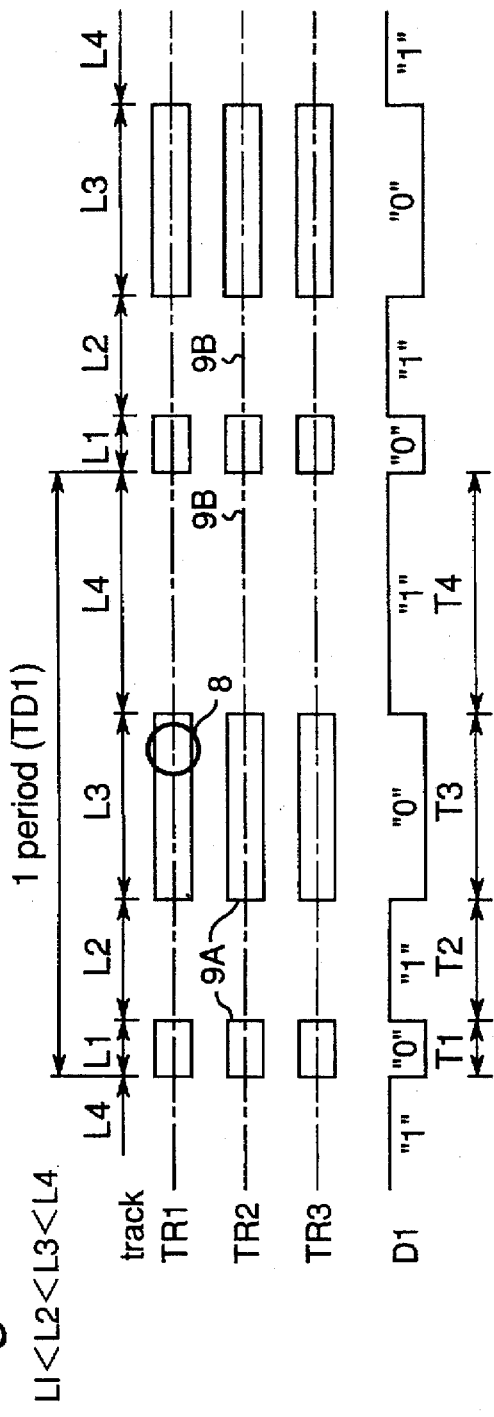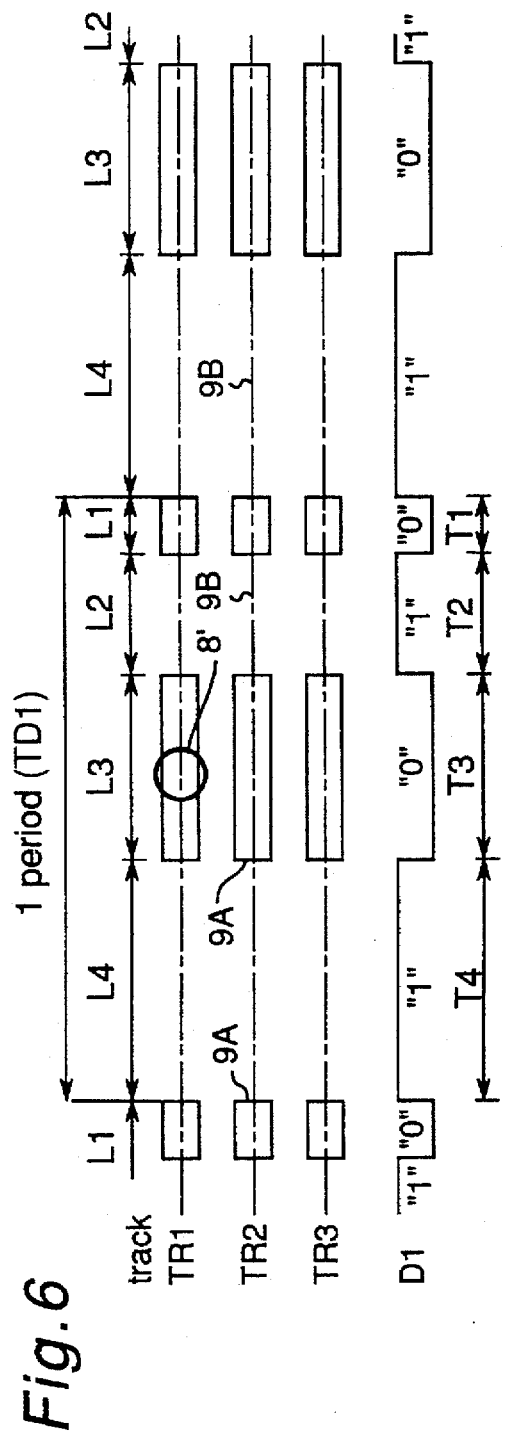

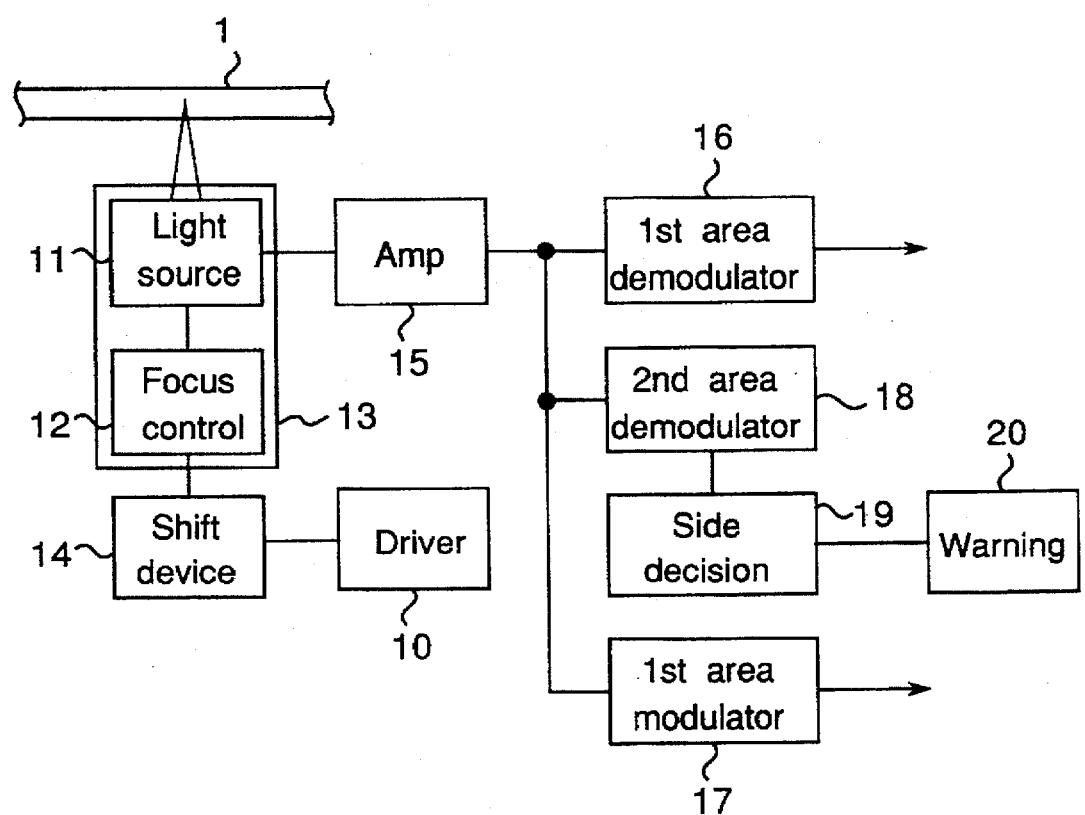

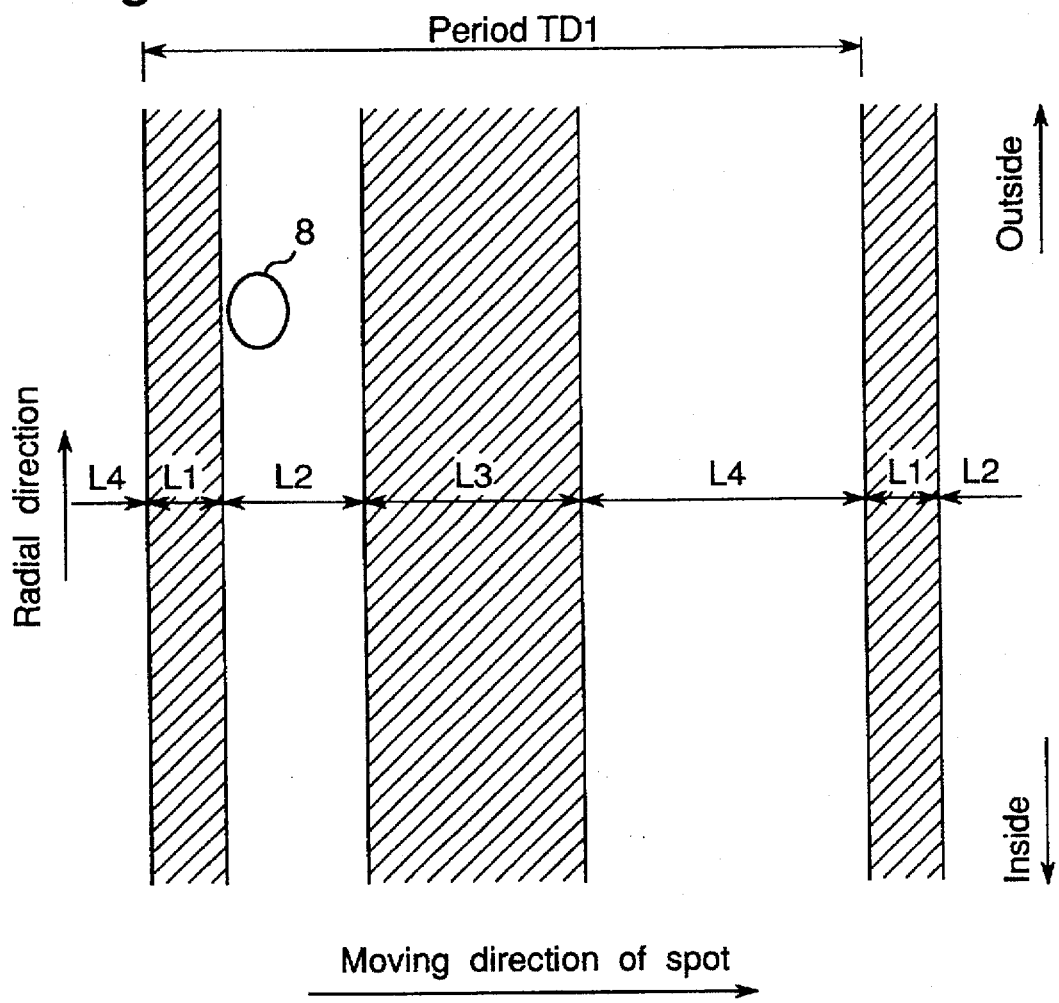

OPTICAL MEDIUM HAVING A DATA PATTERN FOR DETECTING AN UPSIDE-DOWN INSERTION, AND REPRODUCING APPARATUS FOR USE THEREWITH

BACKGROUND OF THE INVENTION

1. Field of the Invention

The present invention relates to an optical medium including an information layer interposed between two transparent plates and an apparatus for recording and reproducing the optical recording medium.

2. Description of the Prior Art

An optical disk and an optical card are optical media wherein information is recorded or reproduced optically. In most of the optical media, information is recorded or reproduced with a micro light spot focused on the medium.

For example, a compact disk (CD) comprises a is transparent plate of 1.2 mm of thickness, an information layer formed thereon by adhering a reflection film such as a metallic thin film or the like, and a protection layer formed on the information layer. If necessary, a print layer is formed on the protection layer. Pits are formed on a side of the transparent plane in contact with the information layer. Information is recorded by changing lengths of the pits and distances therebetween. In the reproduction of the information, a light beam from an optical head is focused on the information layer. At the pits, the phase of reflected light is different from that of the adjacent regions. Then, optical interference occurs, and reflectance is decreased. On the other hand, at regions other than the pits, no interference 5 occurs, and reflectance is high. Then, information is reproduced as a change in reflectance.

Increase in recording capacity is demanded of optical media. In order to increase recording capacity in an optical disk, it is necessary to decrease a spot size of a light beam. If the wavelength of the light beam is $\lambda$ and the numerical aperture (NA) of an object lens is NA, the spot size is proportional to $\lambda/NA$. Then, it is required to shorten $\lambda$ or to increase the numerical aperture in order to increase recording capacity. However, if a lens has a higher numerical aperture, top aberration referred to as tilt, caused by relative inclination of the disk plane to an optical axis of light beam, becomes larger, as described in U.S. Pat. No. 5,235,581. In order to decrease the top aberration, it is necessary to decrease the thickness of the transparent plate. On the other hand if the transparent plate becomes thinner, mechanical strength thereof becomes weaker. Then, a structure is preferable in which another transparent plate is adhered to the transparent plate for reinforcement, and especially in which the materials and the thicknesses of the two transparent plates are the same as each other. An optical disk referred to as a digital video disk or digital versatile disk (DVD) for high recording capacity uses a lens having a high numerical aperture. A DVD uses a diode laser of 650 nm of short wavelength and an optical spot with high numerical aperture of object lens increased to 0.6 from 0.45 for a compact disk. A spot size for a DVD is decreased by a ratio of about 1/1.6 on the optical spot relative to that of a CD.

For the above-mentioned reason, a DVD has two thin plates of 0.6 mm of thickness adhered to each other with an information layer therebetween, in contrast to a compact disk having a single transparent plate of 1.2 mm of thickness. Thus, a DVD comprises a first transparent plate of 0.6 mm of thickness, an information layer formed thereon by adhering a reflection film such as a metallic thin film or the like, a second transparent plate of 0.6 mm of thickness, an adhesion layer adhering the, information layer and the second transparent layer. If necessary, a print layer is formed on the second transparent layer. Similarly to a compact disk, pits are formed on a side of the transparent plane in contact with the information layer. However, lengths of the pits and distances therebetween become shorter than the counterparts in a compact disk. Then, a track pitch becomes shorter that is a pitch of information tracks comprising a pit array. Thus, recording density is increased. The second transparent plate used for reinforcement is made of the same material as the first transparent plate and has the same thickness of 0.6 mm. In the reproduction of the information, a light beam from an optical head is focused on the information layer. At the pits, reflectance is decreased, while reflectance remains high at regions other than the pits. Then, information is reproduced as a change in reflectance.

An optical disk is inserted into an apparatus for reproducing information. By changing an optical disk inserted into the apparatus, different music and pictures can be reproduced. However, there are problems on the insertion of an optical disk.

For example, in an apparatus for reproducing a compact disk by illuminating a light beam from below the disk, reproduction is performed normally if the compact disk is inserted so that its front side is illuminated by the light beam. However, if a compact disk is inserted inversely, the light beam is shaded by a print layer, and information cannot be reproduced. For a compact disk having no print layer, the light beam transmits to the compact disk. However, because the thickness of the protection layer is much smaller than that of the transparent plate, large aberration occurs, or a light beam cannot be converged at the information layer. Then, information cannot be reproduced. An inexperienced user may insert a compact disk inversely. Therefore, it is desirable to warn the user of the occurrence of an erroneous insertion by displaying an error message or by discharging the disk from the apparatus. Most compact disk drives available now have such a function, and the side decision (i.e. determination of whether the disk is inserted with the correct side facing the light source) of an optical disk is an important function of a compact disk player.

Japanese Patent laid open Publication No. 58155524/1983 describes methods for deciding whether a side of the incidence of the light beam is a front side or a back side. The front side means a side from which information is reproduced with the light beam. In one of the methods, the side is decided according to whether reproduced signals exist or not. For a compact disk, reproduced signals (data signals) of a predetermined level can be obtained by the optical head only from the front side. However, no reproduced signal or no data can be obtained from the back side. Thus, reproduced signals exist or not according to whether the front side or the back side is reproduced.

However, this type of side detection cannot be applied to a DVD having two transparent plates of the same thickness adhered to each other. Even if the light beam is emitted to the back side, reproduced signals may be obtained by the optical head. In this case, side decision cannot be performed on the basis of reproduced signals. For a disk having no print layer or for a disk having a partial print layer, the beam transmits the second transparent plate having about the same thickness as the first one. Therefore, optical conditions when the light beam illuminates the back side are similar to those when the light beam illuminates the front side, and no large aberration occurs in contrast to a compact disk. After the light beam transmits the adhesion layer, it converges on the information layer, and reproduced signals are obtained though levels thereof may be decreases somewhat. Then, reproduced signals are obtained from either of the correct sides, and the side cannot be determined. Further, even if an optical disk is inserted normally, reproduced signals may not be obtained if a malfunction in the optical head or in the electric circuit occurs. However, the method cannot discriminate erroneous insertion from the malfunction in the apparatus.

Japanese Patent laid open Publication No. 58-1SS524/1983 describes another method for side decision. This method uses a reflection type optical detector comprising a light-emitting diode and a photodiode for receiving a light. The side is decided according to a difference in reflectance of a label (print layer) from that of the information layer. However, this method cannot be applied to a disk having no label. Further, this method needs the reflection type optical detector and this increases a cost of the apparatus. still further, the detector increases the size of the apparatus.

Cartridges are used for most optical disks for recording, and the side decision is performed on the cartridge. However, a cartridge is expensive, and it is hard to use for consumer appliances. Even for an optical disk for recording, when a changer system is used, an optical disk may be used by removal from the cartridge. In this case, an optical disk may be inserted erroneously into a changer. Then, for an optical disk used with a cartridge, side decision irrespective of the cartridge is also desirable. Further, because a changer system has a complicated mechanism and control system, it is desirable that a malfunction or an operation error can be decided reliably.

SUMMARY OF THE INVENTION

An object of the present invention is to provide an optical medium including an information layer interposed between two transparent plates on which side decision can be performed reliably when inserted in an apparatus for recording or reproducing information in the optical medium.

Another object of the present invention is to provide an apparatus for recording or reproducing information in the optical recording medium wherein side decision of an optical medium can be performed reliably.

An optical medium according to the invention comprises an information layer interposed between first and second transparent plates. In the information layer, a second area for recording a data pattern on which a direction of data arrangement is decided is provided besides a first area for recording main information. If the first and second transparent plates have about the same thickness of about the same optical length, the data pattern in the second area is reproduced with a light beam emitted from either of a front side and a back side thereof. Then, erroneous insertion of the optical medium can be determined by detecting a direction of data arrangement in reproduced signals on the data pattern. Preferably, the data pattern recorded in the second area includes at least three different lengths, and the lengths in the data pattern increase or decrease successively. The optical medium may have a label layer on the second transparent plate for displaying an image so that the label layer does not substantially overlap the second area in the information layer.

An optical recording and reproducing apparatus according to the invention for the optical medium including the second area in the information layer includes a decision device for deciding a direction of data arrangement of signals received from the optical head in the second area. Preferably, the optical medium has a data pattern including successive increase or decrease in length of signals in the data pattern, and the decision device comprises a first counter for determining a length of a signal in the data pattern and a comparator for comparing the length of a first signal determined by the counter with the counterpart of a second signal next to the first signal. Then, successive increases or decreases in length in the signals in the data pattern is 5 counted according to a result of the comparison. The direction of data arrangement in the reproduced data pattern is detected by counting the number of successive increases or decreases. If the count exceeds a predetermined number determined according to the data pattern, the normal or erroneous insertion of the optical medium into the apparatus is detected.

An advantage of the present invention is that side decision of an optical medium can be performed easily and reliably.

BRIEF DESCRIPTION OF THE DRAWINGS

These and other objects and features of the present invention will become clear from the following description taken in conjunction with the preferred embodiments thereof with reference to the accompanying drawings, and in which:

FIG. 1A is a sectional view of an optical disk from a center to an outer edge thereof of an embodiment according to the invention, and FIG. 1B is an enlarged sectional view of a part in FIG. 1A including an optical spot;

FIG. 3A is a sectional view of the optical disk from a center to an outer edge thereof inserted erroneously into the apparatus, and FIG. 3B is an enlarged sectional view of a part in FIG. 3A;

FIG. 5 is a diagram for illustrating reproduction of data from the second area in the information layer when the is optical disk is inserted correctly into the reproduction apparatus;

FIG. 6 is a diagram for illustrating reproduction of data from the second area in the information layer when the optical disk is inserted erroneously into the reproduction apparatus;

FIG. 7 is a block diagram of an apparatus f or reproducing and recording information in an optical disk;

FIG. 11 is a diagram of a modified a example of data pattern in a second area of an optical disk.

DETAILED DESCRIPTION OF THE PREFERRED EMBODIMENTS

Figure 2:
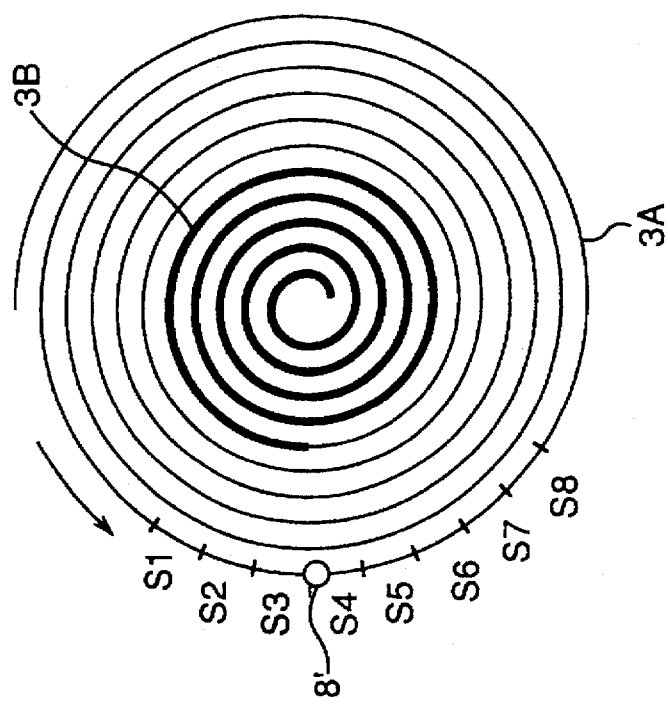
FIG. 2 is a schematic diagram of a recording layer when the optical disk is observed from the side for entering a light beam into the disk when the disk is inserted into an apparatus so that the light beam illuminates the surface A as shown in FIG. 1A.

Referring now to the drawings, wherein like reference characters designate like or corresponding parts throughout the several views, FIG. 1A shows a section from a center to an outer edge of an optical disk 1 of an embodiment according to the invention used only for reproduction. This optical disk is an example of an optical medium having an information layer interposed between two transparent plates. The optical disk 1 comprises a first transparent plate 2, an information layer 3, a connection layer 4, a second transparent plate 5 and a print layer or label layer 6 layered successively. The connection layer 4 adheres the information layer 3 to the second transparent layer 5. In FIG. 1, the right side and the left side correspond to the center and the outer edge, respectively, and the remainder of the disk is omitted for ease of explanation. Reference characters $R_1$, $R_2$, $R_3$ and $R_4$ represent radii at points where they are written. $R_4$ corresponds to the outer edge of the optical disk 1. A lower plane to which a light beam 7 is emitted for reproducing information is front side A, while an upper plane opposite to the lower plane is back side B. 'When the optical disk is inserted into an apparatus for reproduction, it rotates counterclockwise if viewed from the front side A. A feature of the optical disk is that erroneous insertion thereof can be detected. The information layer 3 has a first area 3A for recording main information between radii $R_2$ and $R_3$ Further, it has a second area 3B for side decision between radii $R_1$ and $R_2$ inside the first area. It is preferable that the second side 3B is provided inside the first area 3A. The inventors note that data arrangements of reproduced signals are different according to movement of the optical spot on the information layer relative to an information track. Then, a data pattern which provides for easy detection of a direction of the data arrangement is formed in the second area. Preferably the data pattern is recorded repetitively in the second area. Track pitch and recording density may be different in the first and second areas. The data pattern in the second area may be recorded coarsely for easy reproduction. The optical disk 1 is explained below in detail. The first and second transparent plates 2, 5 are preferably made of a material having small optical absorption at wavelength regions of the light beam 7 and having a high strength, such as a polycarbonate resin, a polymethylmethacrylate resin. They are generally made by injection molding of molten resin', but may be made of glass. A side of the first transparent plate 2 in contact with the information layer 3 has pits, and information is recorded by changing lengths of pits and distances therebetween in a track. The second transparent plate 5 is a transparent plate having two flat sides. A method of forming the transparent plates and a mastering method for recording information are known in a manufacturing process for an optical disk, and they are not explained here in detail. The first and second plates 2 and 5 have thicknesses $t_1$, and $t_2$ nearly equal to each other and indices of refraction $n_1$, and $n_2$ nearly equal to each other. The thicknesses $t_1$, and $t_2$ depend on the size of the disk, and the optimum values thereof are determined by considering the recording density and the mechanical strength.

Pits are formed in a spiral line, and an information track (not shown) comprises the pit array. The side A of the disk is used as a front side of the information layer 3, while the side B is used as a back side thereof.

In an optical disk used only for reproduction, it is preferable for the information layer 3 to have a predetermined reflectance in a wavelength range of the light beam 7. Further, it is desirable for the pits formed on the second transparent plate 2 to be transferred easily to the information layer 3 in a production process. A metallic thin film made of gold, aluminum, chromium, copper or an alloy thereof satisfies these conditions. A depth of the pits transferred to the information layer 3 is about $\lambda/4$–$\lambda/8$ of optical length (a product of the index of refraction $n_1$, of the first plate 2 and a distance in the pit) where $\lambda$ denotes wavelength of the light beam 7. If the first plate 2 is made of polycarbonate resin having an index of refraction of about 1.5 and the wavelength is 650 nm, the depth is about 108-54 nm of physical length, and it is much smaller than the thickness of the other layers.

As described above, pits are transferred correctly on the front side of the information layer 3 because the layer is adjacent to the first transparent plate 2. In a prior art optical disk, it was unnecessary to read information from the back side B. However, in the present embodiment, it is needed for side decision to read information from the back side at least from the second area of the information layer 3. Further, because the depth of the pits is shallow as described above, if the information layer is too thick, pits are not formed on the back side thereof, while if it is too thin, the information layer transmits the light beam 7 to decrease reflectance. Then, it is desirable that the thickness of the information layer 3 is between 5 and 200 nm for an optical disk used only for reproduction.

As shown in FIG. 1, the information layer 3 has the first area and the second area at the outer side and at the inner side thereof. Main information is recorded in the first area. The main information means digital visual and musical signals for a digital versatile disk (DVD), and programs and data for a disk for a computer. In the second area, a data pattern is recorded repeatedly. The data pattern has to be read from two sides of the optical disk, and the direction of the data arrangement has to be decided easily. Another region for recording other management information may be provided in the second area. The management information includes, for example, conditions for recording and reproduction such as control track, and directories and the like for file management, and an appropriate format for the management information may be adopted. The management information is not explained here further because it is not an essential part of the invention.

Next, the adhesion layer 4 is explained. The adhesion layer 4 is required to transmit light at least in the second area at wavelengths of the light beam 7. it is desirable that aberration generated at the adhesion layer 4 is small. An adhesion process for the adhesion layer 4 uses an ultraviolet-rays setting resin. However, any adhesion process may be used which has small foreign matter such as bubbles, transmits the light at the wavelength range of the beam and has a sufficient adhesion strength. The thickness $t_3$ of the adhesion layer 4 is about a few to a few hundreds of μm by taking into account adhesion strength, uniformity of the adhesion layer, a curing time and the like. Further, the thickness needs to be 100 μm or less in order to suppress aberration when the light beam 7 is emitted to the back side B.

Next, the print layer 6 is explained. The print layer 6 includes a printed image of drawings and characters, and it is usually called a label. For example, a label includes drawings and characters which identify contents recorded in the optical disk 1, or beautiful drawings and characters for increasing a value of the disk as a good. The print layer 6 is formed by known print technology such as silk screen print, or offset print.

As shown in FIG. 1A, a label area wherein the print layer 6 is formed is provided by avoiding substantially the second area of the information layer 3 opposing the print layer 6 because it is not desirable for the second area to be wider than needed. If an area between radii $R_1$ and $R_2$ for the second area is wider, the second area becomes narrower and a storage capacity is decreased. Specifically, if an extension of the light spot formed at the back side B is denoted as $\delta_1$, the label area or the print layer 6 is provided by avoiding at least an area between radii $(R_1-\delta_1)$ and $(R_1+\delta_1)$, as shown in FIG. 1A, where $\delta L_1$ and $\delta L_2$ denote lengths from the light beam 7 to edges of the print layer 6 ($\delta L_1 > \delta_2$ and $\delta L_2 > \delta_1$). If the thickness of the second transparent plate 5 is denoted as $t_2$, the index of refraction thereof is denoted as $N_2$, and a numerical aperture of a converging optical system of an optical head is denoted as $N_{a1}$, a converging angle $\theta$ of the out-going light beam is $\sin^{-1}(N_{a1}/n_2)$ and the light beam is expanded by $\delta_1 = (t_2+t_3)\tan(\theta)$, as shown in FIG. 1A. Usually, the adhesion layer 4 is sufficiently thinner than the second transparent plate 5. Then, $\delta_1 = t_2\tan(\theta_2)$.

As shown in FIG. 1B, the light beam emitted from an optical head (not shown) is incident on the surface A and converged at and focused on the information layer 3 as a light spot 8. A light reflected by the information layer 3 returns to the optical head and signals are reproduced. Because the reflected light generates optical interference at pits because of differences in phase, the reflectance of the light from the pits is decreased. On the other hand, because the reflected light from portions other than the pits generates no interference, the light from the portions has high reflectance. Then, information can be reproduced as a change in quantity of light reflected.

FIG. 2 shows the recording layer 3 schematically if observed from the side for entry of the light beam 7 into the disk when the disk is inserted into the apparatus so that the light beam 7 is emitted onto the surface A as shown in FIG. 1A. A spiral track is provided clockwise from the inner side to the outer side. The second area illustrated with a thick line is provided at the inside, while the first area illustrated with a narrow line is provided at the outside. In the first area, main information is recorded sequentially in predetermined recording units, as shown in FIG. 2 as . . . , S1, S2, S3, S4, S5, S6, S7, S8, . . . . The units are ordinarily called sectors or blocks.

The light spot 8 is controlled to be located on a track by a tracking controller (not shown) Because the optical disk 1 is rotated counterclockwise, the optical head reproduces the recording units in the order of . . . , S1, S2, S3, S4, S5, S6, S7, S8, . . . from the inside to the outside.

It is a feature of the light of the embodiment that erroneous insertion of the optical disk can be detected. As mentioned above, in the second area, a data pattern is recorded repeatedly so that the direction of the data arrangement can be decided easily according to relative 25 movement of the light spot 8 against the track. Then, as explained below, the side is detected by a difference in reproduced data pattern in the second area.

FIG. 3A shows a section of the optical disk 1 from a center to an outer edge thereof when the optical disk is inserted erroneously into the apparatus so that the light beam 7 illuminates the disk 1 from the back side B. FIG. 3B shows an expanded section of a portion ofi which a light spot 81 is formed. The optical disk 1 has the back side B at the lower side and the front side A at the upper side in contrast to FIG. 1A. The light beam 7 is converged onto the back side of the information layer 3 through the second transparent plate 5 and the thin adhesion layer 4. Then, an optical length of the light beam 7 from the surface of the disk to the information layer 3 has a value similar to the counterpart when the light beam 7 illuminates the disk from the front side A shown in FIG. 1A, and the aberration is small. Then, the light spot 81 is formed at the back side of the information layer 3.

Figure 4:
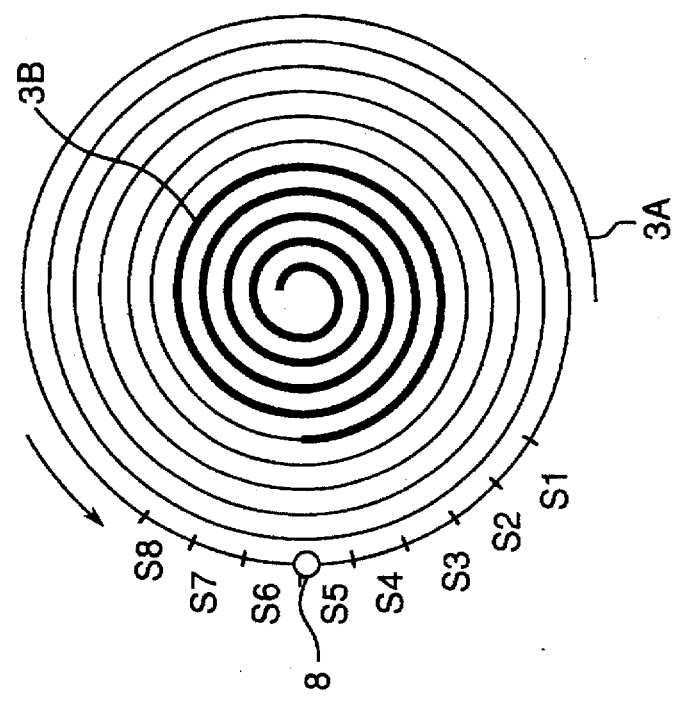
FIG. 4 is a schematic diagram of a recording layer when the optical disk is observed from the side for entering a light beam into the disk when the disk is inserted into the apparatus so that the light beam illuminates the surface B as shown in FIG. 3A.

FIG. 4 shows the recording layer 3 schematically when the optical disk is observed from the side for entering the light beam 7 into the disk when the disk is inserted erroneously into the apparatus so that the light beam 7 is converged onto the surface B as shown in FIG. 3A. In contrast to FIG. 2, the spiral track is provided counterclockwise from the inner side to the outer side. Because the optical disk 1 is rotated counterclockwise as in the case shown in FIG. 2, the direction of the movement of the light spot 81 on a track in the information layer 3 moves in a reversed direction to the counterpart in FIG. 2, and the order of reproduction of signals in time is . . . , S8, S7, S6, S5, S4, S3, S2, S1, . . . , and this is a reverse of that in the counterpart of FIG. 2. Then, the order of reproduced signals or data arrangement when the signals are reproduced from th6 front side A is reversed from that when the signals are reproduced from the back side B. In other words, because the spiral direction is reversed when viewed from the incidence side of the light beam in the two types of insertion, the relative moving direction of the light spot 8, 8' to the track is reversed, so that the data arrangement in reproduced signals is also reversed. By discriminating the moving direction of the light spot 15 relative to the track, the side of the optical disk inserted into an apparatus can be decided.

When the optical disk is inserted correctly as shown in FIG. 1A, signals reproduced by the optical head are output as analog signals, and after the analog signals are processed appropriately, they are binarized. obtained bi-level signals are subjected to digital processing such as decoding and error correction. Thus, reproduced signals are obtained. Various signal processes are known and they are not explained here. on the other hand, even when the optical disk is inserted erroneously as shown in FIG. 3A, reproduced signals are obtained. However, because the data arrangement is reversed, the information recorded in the information layer 3 cannot be reproduced.

In the side decision (or decision of whether it is the front side or the back side facing the light beam), the apparatus moves the optical head towards the inside to the second area of the information layer 3 and reads data formed in the second area with the optical head by activating focus tracking to form the light spot 8, 8'.

Next, reproduction of data from the second area 3B in the information layer 3 is explained with reference to FIG. 5 when the optical disk is inserted correctly into a reproduction apparatus. FIG. 5 shows an enlarged view of the second area at an upper side and reproduced bi-level signal D1 obtained by binarizing signals reproduced by the optical head at a lower side. In the second area 3B, three tracks TR1, TR2 and TR3 are shown to comprise pit arrays. A data pattern which can be easily detected as to the data arrangement is formed repeatedly in the second area spirally. For example, a period (TD1) of the data pattern comprises a pit 9A of length L1, a pit distance 9B of length L2, another pit 9A of length L3, and another pit distance 9B of length L4 arranged in the order mentioned above. Two periods of the data pattern are shown in FIG. 5. In the data pattern, four lengths L1–L4 of the two pits 9A and the two pit distances 9B in a period TD1 have a relation of L1<L2<L3<L4. That is, the length increases successively in a moving direction of the light spot 8 from left to right in FIG. 5.

The bi-level signal Di of reproduced signals is denoted as "0" for the pits 9A and "1" for the pit intervals 9B. Then, the time lengths T1, T2, T3 and T4 of "0" and "1" corresponds to the lengths L1, L2, L3 and L4. Then, the time lengths have a relation that T1<T2<T3<T4. Thus, when the light spot is emitted onto the second area from the front side A to reproduce the second area, the time lengths of bi-level signals Di increase gradually.

Next, reproduction of data from the second area 3B in the information layer 3 from the back side B is explained with reference to FIG. 6 when the optical disk is inserted erroneously into the reproduction apparatus. FIG. 6 shows an is enlarged view of the second area 3B at an upper side and reproduced bi-level signal Di obtained by binarizing signals reproduced by the optical head at a lower side. In the second area 3B, the three tracks TR1, TR2 and TR3 are shown to comprise pit arrays. In this case, the data pattern in a period TD1 comprises a pit distance 9B of length L4, a pit 9A of length L3, another pit distance 9B of length L2, and another pit 9A of length Li arranged in the order mentioned above. That is because the direction of the spiral track is reversed in contrast to the case shown in FIG. 5 where the data pattern is reproduced from the front side A. That is, the length decreases successively in a moving direction of the light spot 81 from left to right in FIG. 6. When the optical disk 1 is rotated counterclockwise, the time lengths of hilevel signal Di of reproduced signals, that is, T4, T3, T2 and T1, decrease successively in contrast to reproduction from the front side A.

Then, the direction of data arrangement can be determined by measuring the lengths of the bi-level signals D1 and by checking if the lengths of the bi-level signals increase or decrease successively. Therefore, the side of the optical medium can be determined according to the direction of data arrangement by whether data pattern is reproduced from the front side A or from the back side B.

FIG. 7 shows a block diagram of an apparatus for reproducing information from an optical disk having the data pattern recorded in the second area in the information layer. The apparatus is similar to a prior art apparatus except for components related to the reproduction in the second area. The apparatus comprises a driver 10 having a spindle motor (not shown) for rotating the optical disk 1, and an optical head 13 for emitting a light beam by a light source (a laser diode 11). The optical head 13 converges the light beam by a focus controller 12 to form a light spot on the optical disk. The optical head 13 is moved by a motor of a shift device 14 along the radial direction above the first and second areas in the information layer. The shift device 14 also performs tracking control. When data are reproduced, signals from the optical head 13 are amplified by an amplifier 15 and reproduced by a first area demodulater 16, while when data are recorded, data are modulated by a first area modulator 17 and recorded by the optical head 13. The above-mentioned reproduction and recording of main information are similar to the operation in a prior art apparatus. The apparatus shown in FIG. 7 further comprises a second area demodulator 18 and a side decision circuit 19. The data pattern in the second area is read by the optical head 13 moved above the second area by the shift device 14 and demodulated by the second area demodulator 18. Then, the side decision circuit 19 decides the side according to the signals received from the demodulator 18. If the side decision circuit 19 decides that the side is the back side, a warning circuit 20 warns the user of the erroneous insertion by displaying an error message.

Figure 8:
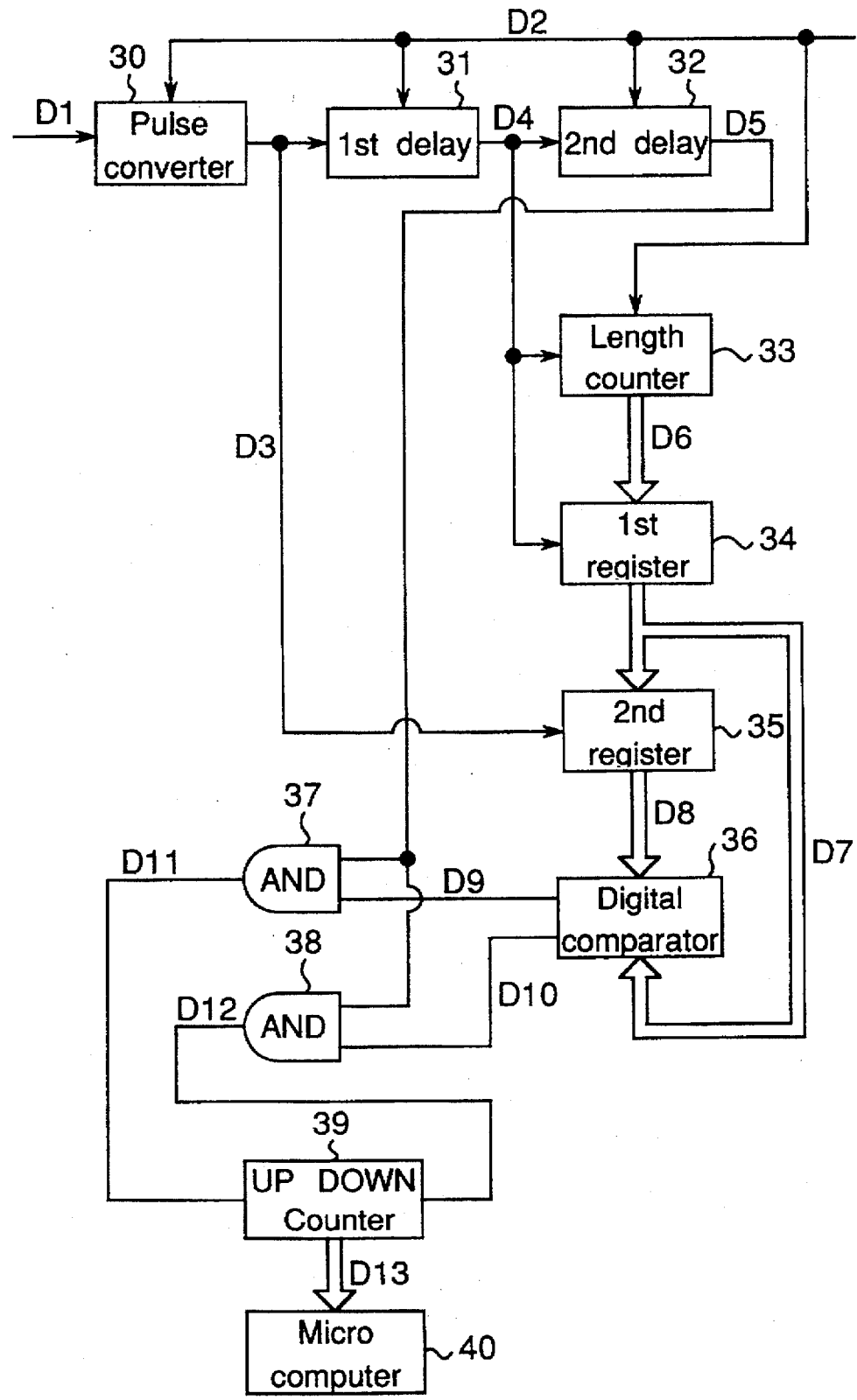
FIG. 8 is a block diagram of a device for side decision.
Figure 9:
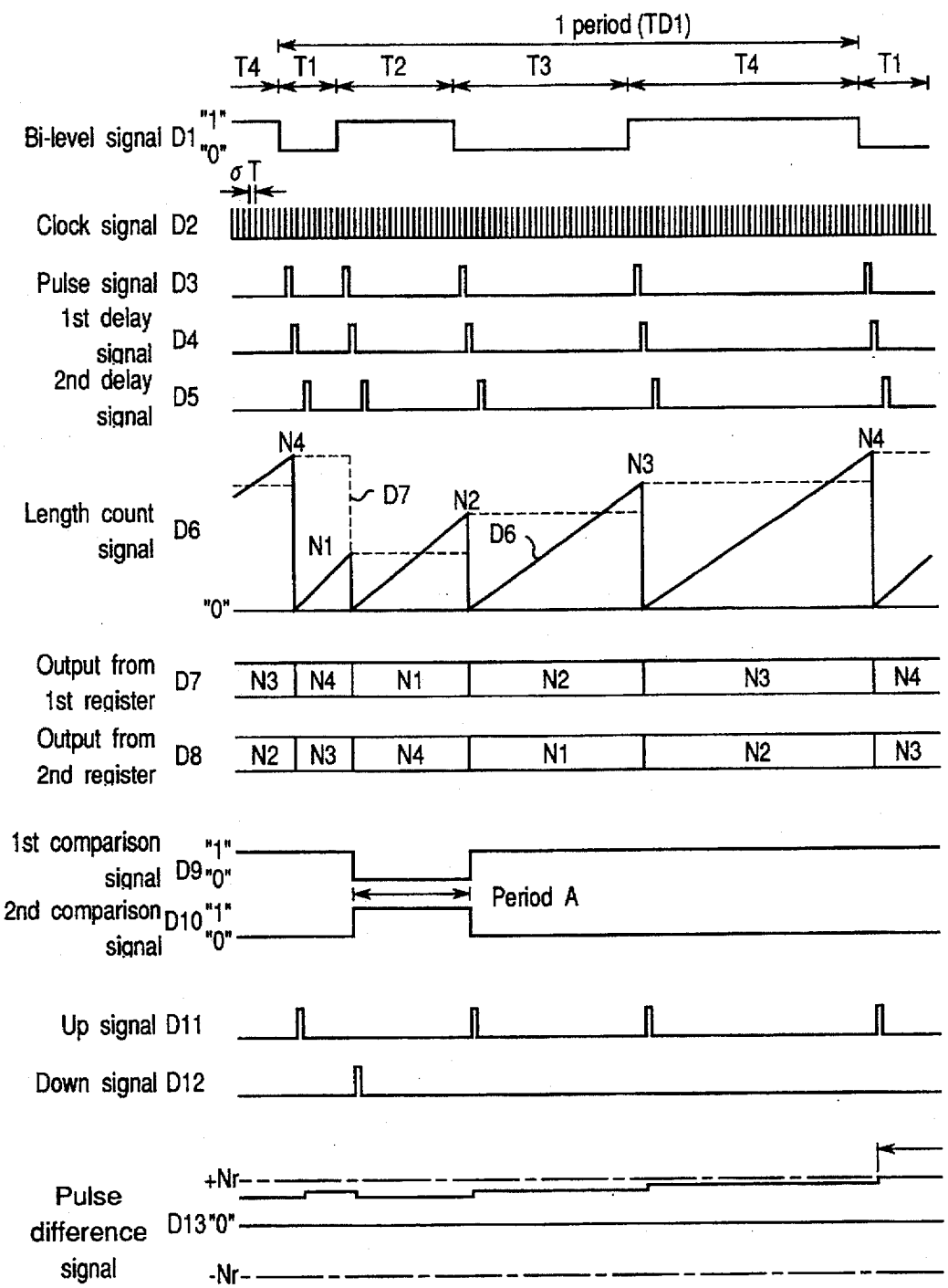
FIG. 9 is a diagram of waveforms of signals in the side decision device shown in FIG. 8 in a case of normal insertion.
Figure 10:
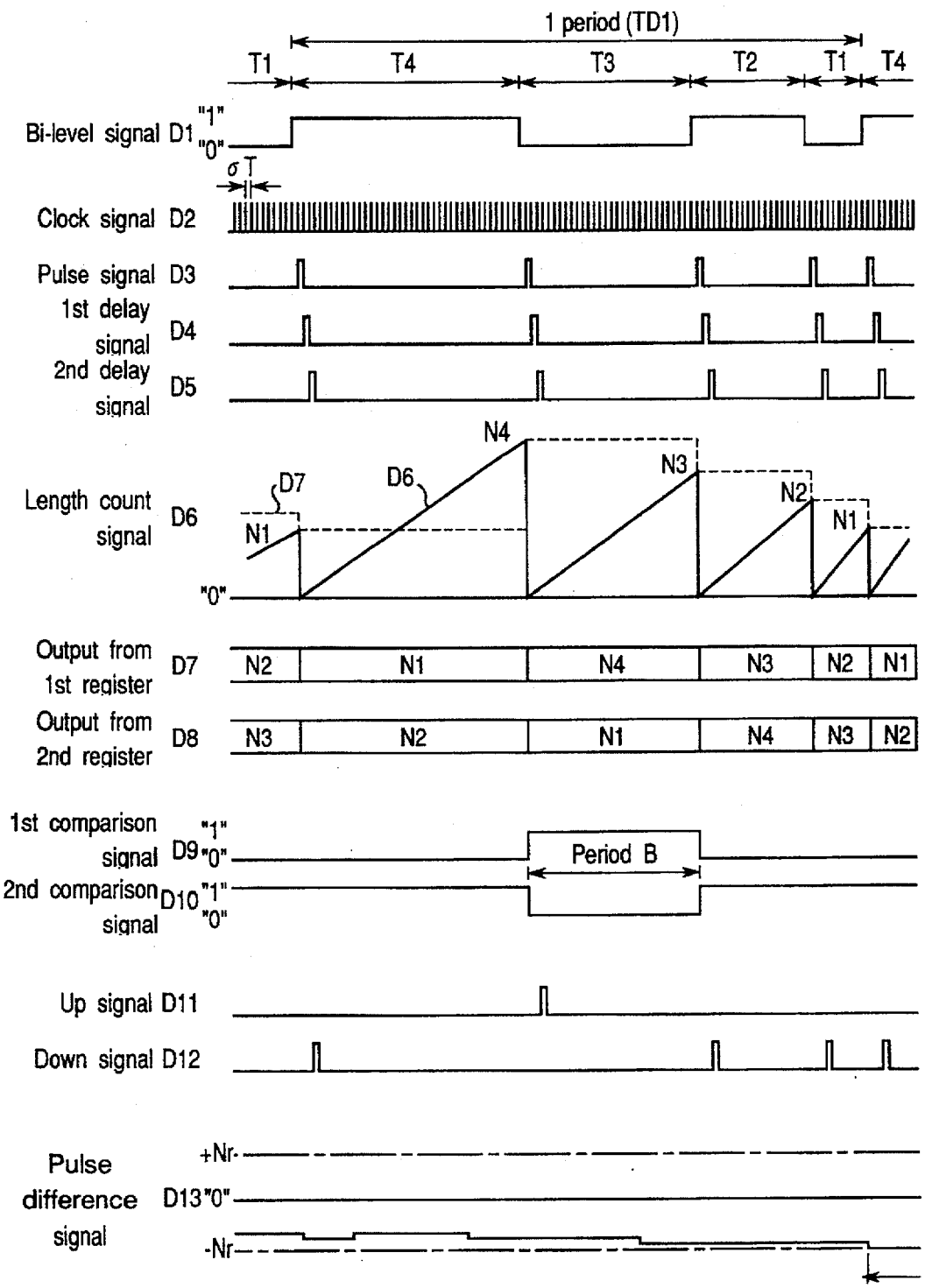
FIG. 10 is a diagram of waveforms of signals in the side decision device shown in FIG. 8 in a case of erroneous insertion.

FIG. 8 shows a block diagram of the side decision circuit 19, and FIGS. 9 and 10 show waveforms in the device for two cases of normal insertion and erroneous insertion. First, operation of the side decision circuit 19 is explained with reference to FIGS. 8 and 9 in a case when the second area 3B in the information area 3 is reproduced by emiting the light beam onto the front side A. In the circuit shown in FIG. 8, a bi-level signal Di received from the optical head is sent to a pulse converter 30. On the other hand, clock signals D2 are supplied to the pulse converter 31, first and second delay circuits 32, 33 and a length counter 34. The pulse converter 31 generates a pulse signal D3 at leading and trailing edges of the bi-level signal Di in synchronization with the clock signal D2. The pulse signal D3 is sent to the first delay circuit 32 and a second register 36. The first delay circuit 32 sends a first delayed signal D4 by delaying the pulse signal D3 by one period (6T) of the clock signal, to the second delay circuit 33, the length counter 34 and a first register 35. The second delay circuit 33 sends a second delayed signal D5 by delaying the pulse signal D4 by one period (6T) to first and second AND gates 38 and 39. The pulse signal D3 and the first and second delayed signals D4, D5 all have the same period though the timing thereof is different among them.

The length counter 33 measures a length of the first delayed signal D4 by counting the clock signals D2 and sends a length count signal D6 which is increased as time progresses. The signal D6 is reset as "0" at a leading edge of the signal D4, and it then increases gradually until the next leading edge. Then, final counts N1, N2, N3 and N4 in correspondence to the time lengths T1, T2, T3 and T4 of the bi-level signal Di are obtained just before reset to "0". The signal D6 is sent to the first register 35. Because T1<T2<T3<T4, the final counts have a relation that N4>N3>N2>N1.

The first register 35 receives the final count N1, N2, N3, N4 of the length count signal D6 in synchronization of the first delayed signal D4 and holds the value until the next leading edge of the signal D4. An output signal D7 of the first register 35 is sent to the second register 36 and a digital comparator 38.

On the other hand, the second register 36 stores the output signal D7 of the first register 35 in synchronization with a leading edge of the pulse signal D3, or it holds the value just before the output signal of the first register 3S is changed to a next final count. Therefore, an output signal D8 of the second register 36 is delayed by one pulse of the pulse signal D3 relative to the output signal D7 of the first register 35. As shown in FIG. 8, the output signal D7 of the first register 35 changes as N4→N1→N2→N3→N4, while the output signal D8 of the second register 36 changes as N3→N4→N1→N2→N3. The two signals D7 and DB are sent to a digital comparator 37.

The digital comparator 37 compares the numerical values of the two input signals D7 and D8 and sends first and second comparison signals D9 and D10 as a result of comparison. The first comparison signal D9 is "0" if D7≧D8 and "1" if D7<D8, and the second comparison signal D10 is "1" if D7≧D8 and "0" if D7<D8. Then, as shown in FIG. 9, the first comparison signal D9 is "0" only in a period A (refer to FIG. 9) where the signal D7 is "N1" and the signal DB is "N4", while the second comparison signal D10 is "1" only in the period A. The period A is generated when the length of the bi-level signal Di is decreased from "N4" to "N1", but delayed by about one pulse of the signal D3.

The first comparison signal D9 is sent to the first AND gate 36, while the second comparison signal D10 is sent 10 to the second AND gate 37. On the other hand, the second delayed signal D5 is also sent to the AND gates 36, 37 as mentioned above. Therefore, as shown in FIG. 9, the first AND gate 36 sends an up signal D11 in correspondence to the signal D5 except the period A where it is not output, and the second and gate 37 sends a down signal D12 in correspondence to the signal D5 which is output only in the period A. The up signal D11 and the down signal D12 are sent to UP and DOWN terminals of an up-and-down counter 40.

The up-and-down counter 40 increases an output signal or a pulse difference signal D13 when a pulse is received at the UP terminal and decreases the pulse difference signal D13 when a pulse is received at the DOWN terminal. Thus, the up-and-down counter 40 sends a difference in pulses received at the terminals as the signal D13.

In the example shown in FIG. 9, the up-and-down counter 40 receives three up signals and one down signal in a period TD1 of the bi-level signal Di. Then, a count of the pulse difference signal D13 is increased by two.

The pulse difference signal D13 is sent to a microprocessor 41, which stores the pulse difference signal D13 in an internal memory device. The microprocessor 41 has a plus reference signal $+N_r$ and a minus reference signal $-N_r$. If the pulse difference signal D13 exceeds the plus reference signal $+N_r$, the direction of the data arrangement of reproduced data is determined to be a direction where the final count of the count signal D6 increases successively or the front side A is set normally for reproduction. on the other hand, if the pulse difference signal D13 exceeds the minus reference is signal $-N_r$, the direction of the data arrangement of reproduced data is determined to be another direction where the final count of the count signal D6 decreases succesively or the back side B is set for reproduction erroneously.

In the example shown in FIG. 9, the signal D13 agrees with the plus reference value $+N_r$ at the right-hand side therein, and it is decided that the lengths of the reproduced signals in the data pattern decrease successively. Then, the microprocessor 41 decides at the timing that the front side A is reproduced. Then, the microprocessor 41 sends instructions according to the decision such as to search in the main information in the first area 3A.

Next, operation of the device for side decision is explained with reference to FIGS. 8 and 10 in a case when the second area 3B in the information area 3 is reproduced by emitting the light beam onto the back side B. Because the data arrangement is reversed in this case, the bi-level signal Di has a pulse width of T4→T3→T2→T1 decreasing successively. Similarly, the pulse signal D3 also has a length decreasing successively as the pulse width of the bi-level signal Di. The first and second delayed signals D4 and D5 are signals D3 and D4 delayed by δT. Further, the final count of the length count signal D6 decreases succesively as N4→N3→N2→N1 according to the time length or pulse width 15 T4→T3→T2→T1 of the bi-level signal Di. Then, the output signal D7 of the first register 35 decreases as N1→N4→N3→N2→N1, while that of the second register 36 decreases as N2→N1→N4→N3→N2. Then, the first comparison signal D9 is "1" only in a period B (refer to FIG. 10) where the signal D7 is "N4" and the signal D8 is "N1", while the second comparison signal D10 is "0" only in the period B. The up signal D11 corresponds to the signal D5 except the period B where it is not output, and the down signal D12 corresponds to the signal D5 which is output only in the period B. Then, three down signals are generated in a period TD1 of the bi-level signal Di. Therefore, a count of the pulse difference signals D13 output by the up-and-down counter 40 is decreased by two in the period TD1 of the bi-level signal Di.

The microprocessor 41 stores the pulse difference signal D13 and decides that the back side B is reproduced if the pulse difference signal D13 exceeds the minus reference signal $-N_r$. In the example shown in FIG. 10, the signal D13 agrees with the minus reference value $-N_r$ at the right-hand side therein, and it is decided that the back side B is reproduced.

Then, the microprocessor 41 performs abnormal processing according to the decision. That is, it instructs to stop emission control of the laser beam, the focus control and spindle motor control and the like. In order to inform the user of the erroneous insertion, a warning circuit 20 is instructed to display a visual error message. The warning circuit 20 may also give a warning sound. It is also preferable for the disk to be discharged from the apparatus. If a changer system is used, the erroneous insertion is informed to a host computer which controls the changer.

The side decision circuit explained above may be applied to an apparatus used only for reproduction, an apparatus used only for recording and an apparatus used for recording and reproduction.

The above-mentioned embodiment of the optical disk and a method for deciding erroneous insertion can be changed in various ways. For example, the data pattern formed in the information layer 3 may not necessarily be formed in a spiral track, and it may be formed as concentric tracks.

Track pitch, pit width, pit length, pit distance and the like may be different between the first and second areas. In the first area, recording density has to be large in order to store a large amount of main information. On the other hand, the second area is provided for side decision, and the recording density is not needed to be high as far as the direction of data arrangement can be decided. There is a case where it is preferable to form a data pattern of low recording density in order to read the data pattern reliably.

FIG. 11 shows a modified embodiment where a plurality of radial bands are formed in the second area for side decision without forming a track, in contrast to the embodiment explained above. In an example shown in FIG. 11, a period comprises four bands. A plurality of such periods are arranged repeatedly along a relative moving direction of an optical spot 7 shown by an arrow in FIG. 11 crossing the bands. A period of the bands consists of four bands, and the bands have widths of Li, L2, L3 and L4 increasing successively. In FIG. 11, hatched areas represent bands having a lower reflectance, while the other areas represent bands having a higher reflectance. Then, the first band of width Li and the third band of width L3 have the lower reflectance, while the second band of width of L2 and the fourth band of width L4 have the higher reflectance. For example, the bands of lower reflectance may be formed by removing the information layer. As formed information layer bands may be retained as bands of higher ref lectance. The bands of lower reflectance may also be produced by forming uneven surface portions. Further, the bands of lower reflectance may also be formed by forming pits, while as-formed information layer bands may be retained as bands of higher reflectance. The direction of data arrangement can be determined by detecting the band widths Li–L4 successively, similar to the above-mentioned embodiment, according to a difference in data pattern between normal insertion and erroneous insertion.

The optical disk described above is a disk which is used only for reproduction. However, the optical disk may be an optical medium such as an optical disk for recording or an optical disk having an area used only for reproduction and another area for recording.

The number of information layer is not limited to one layers. That is, the side detection may also be performed on an optical disk having a plurality of information layers. Further, it may also by used for an optical recording medium such as an optical disk including an information layer for reproduction and an information layer for recording.

If an optical medium has a plurality of information layers, it is preferable that the data patterns are different among the information layers in order to decide which information layer is reproduced.

A hot melt process is used for a laser disk for adhesion. If the adhesion layer 4 is formed by the hot melt process, the adhesion layer 4 becotdes white due to mixture of bubbles and the like, and then it is hard to transmit light through the adhesion layer 4. If the hot met process is used, another information layer is provided between the adhesion layer 4 and the second transparent plate 5, and a data pattern is formed on the another information layer so as to have a reverse arrangement and a reverse spiral direction of the data pattern formed in the first information layer. The data pattern may be quite different from that formed in the first information layer. When the light beam emits a light beam from the back side, the data pattern in the other adhesion layer is reproduced for side decision.

As to the second area, when an optical disk is inserted, a light spot 8 is formed between radii R, and R. by shifting the optical head and stopping the optical head mechanically or with a position sensor. Then, the range between radii R, and R. has to be larger than a sum of stop precision of the mechanical stop or detection precision of the position sensor and an eccentricity of the optical disk, and it is preferable that the range is larger than 0.3 mm. On the other hand, because it is desirable that the second area is provided in a small area, but in a wide range in the radial direction, the second area is set at the inside of the first 5 area. Then, by considering productivity, it is preferable that the range between radii $R_1$ and $R_2$ is appropriate between 0.3 and 2 mm.

Various data patterns may be formed in the second area in the information area. For example, the pulse width may be decreased successively in a period in contrast to the above-mentioned embodiment where the pulse width is increased successively. The data pattern in the embodiments includes pits and pit distances or bands of four different lengths of L1, L2, L3 and L4. However, if the data pattern comprises data of three different lengths, the direction of data arrangement can be decided. Because the above-mentioned data pattern has lengths of more than three different data in an order of increasing or decreasing length, the side decision can be performed more easily.

This invention relates to a side decision for an optical disk having an information layer and for an optical disk having a plurality of information layers. Therefore, it is desirable that the decision is performed in a time as short as possible after the optical disk is inserted into the apparatus. In detail, it is preferable that the decision is performed when the spindle motor for rotating the optical disk is driven just after an optical disk is inserted, or in particular while the motor is accelerated after the focus control system is activated but while the tracking is still not controlled and the revolution number has not reached a predetermined value.

The label layer 6 may be a sheet of paper or plastic adhered to the second transparent plate 5 at the back side B instead of the print layer explained above. In this case, the label layer 6 is also provided in an area not overlapping the second layer. The print layer or label layer may be applied by a disk maker or adhered by a user.

The data pattern in the second area of the information layer is not necessarily formed in the entire second area is as far as the data arrangement of the data pattern can be recognized. Then, the data pattern may be formed only in a part of the second area.

A pit art utilizes this fact. A pit art is an image of a drawing or characters observed visually by using a difference in reflectance between regions including pits and having lower ref lectance due to interference and region including no pits and having higher ref lectance. The pit art may be formed in the second area.

Figure 12B:
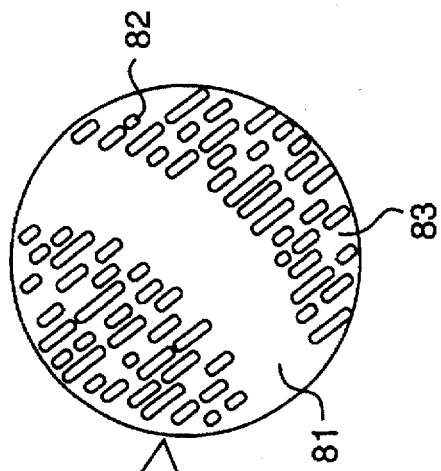
FIG. 12B is an expanded view of a part of the optical disk shown in FIG. 12A.
Figure 12A:
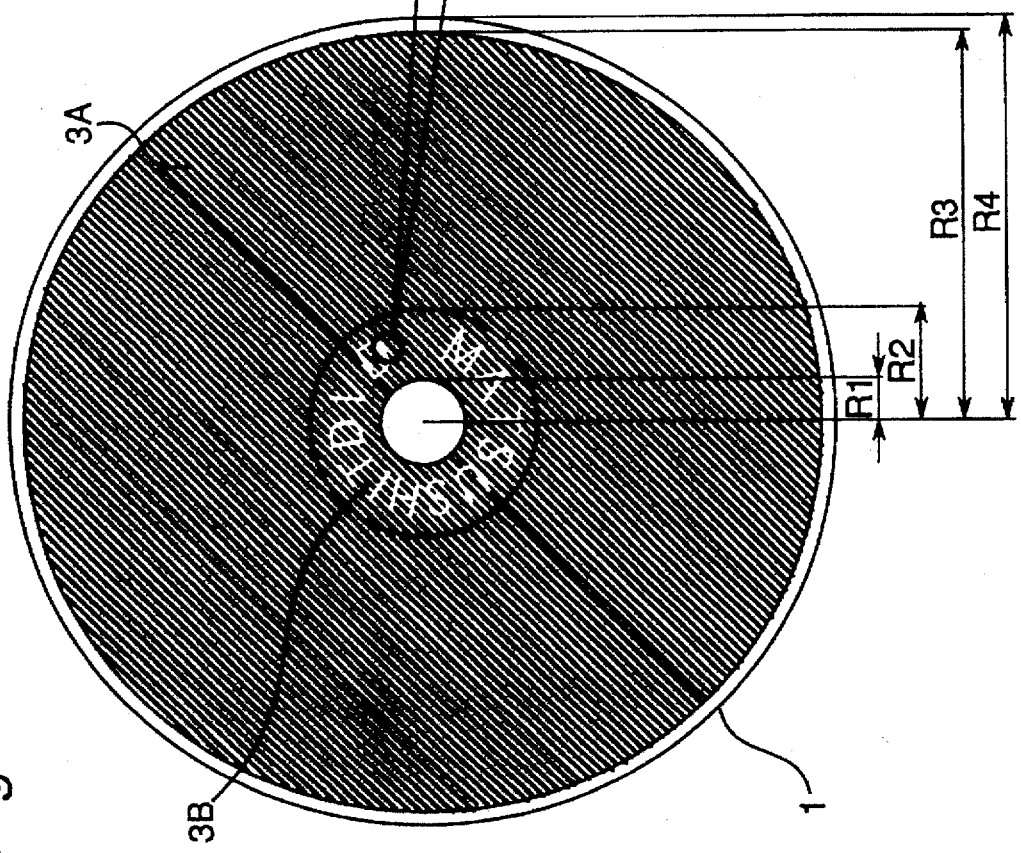
FIG. 12A is a diagram of an example of an optical disk including a pit art.

The pit art is explained with reference to FIGS. 12A and 12B. FIG. 12A shows the back side of an optical disk 1. The second area is formed between radii of $R_1$ and $R_2$ while the first area is formed between radii of $R_2$ and $R_3$ for recording main information in the optical disk. The radii $R_1$, $R_2$, $R_3$ and $R_3$ denotes like radii shown in FIG. 1A. In FIG. 12A, the label is formed by avoiding the area between radii $R_1$, and $R_2$. In the area between radii $R_1$, and $R_2$ pits of the data pattern for side decision are formed. However, an image can be formed in a part of the second area without forming pits. In an example shown in FIG. 12A, a phrase of "MATSUSHITA DVD" is drawn on the information layer 3. As shown in FIG. 12B, characters are formed as flat portions 81 without pits, while adjacent pit portions 83 have pits 82. Therefore, the portions 9D for displaying characters have high reflectance, and they are recognized visually with naked eyes by a user. In FIG. 12, the shaded area represents portions having low reflectance.

In an optical recording and reproduction apparatus, a light beam is emitted usually from the underside to the optical disk as shown in FIG. 1A. Therefore, a user sets an optical disk while observing the disk having the back side facing up.

Therefore, it is preferable that the image of the pit art is provided to be recognized normally when the back side is observed, or the pit art is recognized inversely when observed from the front side.

When a pit art is formed in the second area, the data pattern cannot be read from some regions. When a light beam is emitted to the flat regions having no pits, the optical head does not generate reproduced signals, and reproduced signals are generated only at regions having pits. Therefore, a level circuit is provided to compare the reproduced signal with a predetermined level. Only when the reproduced signal is larger than the predetermined level, a gate is opened to decide data arrangement.

By drawing a pit art in the second area, a content of recorded data can be displayed without the label layer.

Therefore, a printing process can be omitted, and an optical disk can be produced at a lower cost. Further, if a pit art is provided besides the label in the label layer 6, a more effective display can be provided. it can also be prevented to provide an erroneous label.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An optical medium comprising:
   an information layer;
   a first transparent plate disposed on a first side of said information layer;
   a second transparent plate disposed on a second side of said information layer, such that said information layer is interposed between said first and second transparent plates;
   wherein said information layer includes a first area for recording main information and a second area for recording a data pattern which is readable from both the first and second sides of said information layer; and
   wherein said data pattern comprises a series of bi-level signals which produce different patterns depending on a direction of reproduction.

2. The optical medium according to claim 1, wherein the data pattern recorded in the second area of said information layer is recorded by data modulation different from that of the main information recorded in the first area of said information layer.

3. The optical medium according to claim 1, wherein the data pattern recorded in the second area of said information layer includes data of at least three different lengths and the lengths in the data pattern increases or decreases successively.

4. The optical medium according to claim 1, wherein the data pattern recorded in the second area of said information layer has a length equal to or smaller than 1/40 of a track length on the information layer.

5. The optical medium according to claim 1, wherein the data pattern is recorded repeatedly in the second area of said information layer.

6. The optical medium according to claim 1, wherein a track pitch and a recording density in the data pattern in the second area is different from the counterparts of the main information in the first area of the information layer.

7. The optical medium according to claim 1, wherein the second area is provided at the inside of the first area.

8. The optical medium according to claim 1, further comprising an adhesion layer adhering said information layer formed on the first transparent plate to said second transparent plate, and a thickness of said adhesion layer is equal to or less than 100 μm.

9. The optical medium according to claim 1, wherein said information layer has a thickness between 5 and 200 nm.

10. The optical medium according to claim 1, further comprising a label layer applied to said second transparent plate for displaying an image, wherein said label layer does not substantially overlap the second area in said information layer.

11. The optical medium according to claim 10 used for recording, reproduction or erasing by an optical head having a numerical aperture (NA) of Na1, wherein the second area is formed in an area between radii of $R_1$ and $R_2$ ($R_2 > R_1$) of said optical medium on said information layer, and said label layer is not provided at least in an area between radii ($R_1 - \delta 1$) and ($R_2 + \delta 1$) wherein $t_2$ denotes thickness of said second transparent plate, $n_2$ denotes an index of refraction thereof, $\theta_2 = \sin^{-1}(Na1/n_2)$ denotes a conversion angle of light beam at said second transparent plate, and $\delta 1 = t_2 \tan \theta_2$ denotes a radius of light beam at said information layer.

12. The optical medium according to claim 1, wherein the second area in said information layer comprises a region for recording the data pattern and at least one region not recorded having a different reflectance from that of the region for recording the data pattern, wherein an image pattern is displayed according to a difference in reflectance when viewed with naked eyes by an observer.

13. The optical medium according to claim 12, wherein said different patterns include a first pattern produced upon a first direction of reproduction which corresponds to reproduction from said first side of said information layer, and a second pattern produced upon a second direction of reproduction which corresponds to reproduction from said second side of said information layer;
   one of said first and second sides of said information layer constitutes a normal side from which reproduction is to occur; and
   said image is normally observed from the other of said first and second sides of said information layer.

14. The apparatus according to claim 13, wherein said decision device comprises;
   a first counter for determining a length of a signal in the data pattern received from said optical head;
   a comparator for comparing the length of a first signal determined by a counter with the counterpart of a second signal next to the first signal; and
   a second counter for counting successive increase or decrease in length in the signals in the data pattern according to a result of comparison received from said comparator.

15. The apparatus according to claim 13, further comprising a warning device for warning a user of erroneous insertion of the optical disk according to the decision by said decision device.

16. An optical reproducing apparatus for an optical medium comprising an information layer, a first transparent plate disposed on a first side of said information layer, a second transparent plate disposed on a second side of said information layer, such that said information layer is interposed between said first and second transparent plates, wherein said information layer includes a first area for recording main information and a second area for recording a data pattern which is readable from both the first and second sides of said information layer, and wherein said data pattern comprises a series of bi-level signals which produce different patterns depending on a direction of reproduction, said optical reproducing apparatus comprising:
   an optical head for reading signals from the information layer of the optical medium;
   a mechanism for moving said optical head above the second area formed in the information layer of the optical medium; and
   a decision device for counting the series of bi-level signals of the data pattern read from the second area in the information layer, and determining whether the bi-level signals are increasing or decreasing successively.

17. An optical reproducing apparatus for an optical medium comprising an information layer, a first transparent plate disposed on a first side of said information layer, a second transparent plate disposed on a second side of said information layer, such that said information layer is interposed between said first and second transparent plates, wherein said information layer includes a first area for recording main information and a second area for recording a data pattern which is readable from both the first and second sides of said information layer, and wherein said data pattern comprises a series of bi-level signals which produce different patterns depending on a direction of reproduction, said optical reproducing apparatus comprising:

an optical head for reading signals from the information layer of the optical medium;

a mechanism for moving said optical head above the second area formed in the information layer of the optical medium; and a decision device for detecting the pattern produced by the series of bi-level signals and thereby determining the direction of reproduction from the information layer of the optical medium.

* * * * *